United States Patent
Iben et al.

(10) Patent No.: US 10,066,122 B2
(45) Date of Patent: Sep. 4, 2018

(54) FORMABLE FILM

(71) Applicants: Benecke-Kaliko AG, Hannover (DE); Bayer MaterialScience AG, Leverkusen (DE)

(72) Inventors: Dirk Iben, Sereetz (DE); Heino Koch, Alfeld (DE); Stefan Reusch, Metzingen (DE); Heinz Dietmar Gewiss, Meerbusch (DE); Martin Melchiors, Leichlingen (DE); Uwe Klippert, Burscheid (DE); Marc Claudius Schrinner, Cologne (DE)

(73) Assignees: Benecke-Kaliko AG, Hannover (DE); Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/698,422

(22) Filed: Apr. 28, 2015

(65) Prior Publication Data
US 2015/0240116 A1    Aug. 27, 2015

Related U.S. Application Data

(63) Continuation of application No. PCT/EP2013/067602, filed on Aug. 26, 2013.

(30) Foreign Application Priority Data

Oct. 29, 2012  (DE) .................. 10 2012 110 327

(51) Int. Cl.
| | |
|---|---|
| C09D 175/06 | (2006.01) |
| C09D 175/04 | (2006.01) |
| C08G 18/08 | (2006.01) |
| C08G 18/66 | (2006.01) |
| C08J 7/04 | (2006.01) |
| C08G 18/78 | (2006.01) |
| C08G 18/79 | (2006.01) |

(52) U.S. Cl.
CPC ....... *C09D 175/06* (2013.01); *C08G 18/0823* (2013.01); *C08G 18/6659* (2013.01); *C08G 18/7831* (2013.01); *C08G 18/792* (2013.01); *C08J 7/042* (2013.01); *C08J 7/047* (2013.01); *C09D 175/04* (2013.01); *Y10T 428/24802* (2015.01)

(58) Field of Classification Search
None
See application file for complete search history.

(56) References Cited

U.S. PATENT DOCUMENTS

| | | | |
|---|---|---|---|
| 4,808,691 A | 2/1989 | Koenig et al. | |
| 5,034,269 A | 7/1991 | Wheeler | |
| 6,020,419 A | 2/2000 | Bock et al. | |
| 6,682,779 B1 | 1/2004 | Wefringhaus et al. | |
| 6,852,418 B1 | 2/2005 | Zuerbig et al. | |
| 6,927,254 B2 | 8/2005 | Melchiors et al. | |
| 7,754,827 B2 | 7/2010 | Weikard et al. | |
| 8,314,179 B2 | 11/2012 | Iben et al. | |
| 2002/0187309 A1 | 12/2002 | Rost et al. | |
| 2005/0084412 A1* | 4/2005 | MacDonald | A61F 13/8405 422/5 |
| 2005/0287348 A1* | 12/2005 | Faler | B32B 5/18 428/315.5 |
| 2007/0123613 A1 | 5/2007 | Weikard et al. | |
| 2008/0193684 A1 | 8/2008 | Buhring et al. | |
| 2009/0001752 A1 | 1/2009 | Buhring | |
| 2009/0269568 A1 | 10/2009 | Kuhlmann et al. | |
| 2012/0059118 A1 | 3/2012 | Klein et al. | |
| 2012/0094073 A1 | 4/2012 | Buehring et al. | |
| 2012/0259063 A1 | 10/2012 | Gertzmann et al. | |
| 2013/0292883 A1 | 11/2013 | Buehring | |

FOREIGN PATENT DOCUMENTS

| | | |
|---|---|---|
| DE | 24 46 440 A1 | 4/1976 |
| DE | 100 04 499 A1 | 8/2001 |
| DE | 10 2006 019 867 A1 | 10/2007 |
| DE | 10 2009 049 630 A1 | 4/2011 |
| EP | 0 916 647 A2 | 5/1999 |
| EP | 1 688 460 A1 | 8/2006 |
| EP | 2 216 352 A1 | 8/2010 |
| EP | 2 263 856 A1 | 12/2010 |

OTHER PUBLICATIONS

International Search Report dated Nov. 28, 2013 of international application PCT/EP2013/067602 on which this application is based.

* cited by examiner

*Primary Examiner* — Laura C Powers

(74) *Attorney, Agent, or Firm* — Walter Ottesen, P.A.

(57) ABSTRACT

A deformable film has a decorative surface featuring a completely matt appearance. For this purpose, the deformable film has a decorative surface provided with at least one coating comprising the following constituents: (a) an aqueous dispersion of a hydroxy-functional prepolymer, obtainable by conversion of at least one of the following components: (i) a component having hydroxyl groups, (ii) a polyester polyol having hydroxyl groups, (iii) a polyisocyanate having isocyanate groups, (iv) a compound having at least two groups reactive toward isocyanate groups and at least one group capable of anion formation, (v) water, where components (i) to (iii) and the ratio of components (i) to (iii) are selected such that an excess of hydroxyl groups is present relative to the isocyanate groups, and (b) nanoparticles having a number-average particle size of 1 to 1000 nm and (c) a crosslinker having at least two groups reactive toward hydroxyl groups.

12 Claims, No Drawings

FORMABLE FILM

CROSS REFERENCE TO RELATED APPLICATIONS

This application is a continuation application of international patent application PCT/EP2013/067602, filed Aug. 26, 2013, designating the United States and claiming priority from German application 10 2012 110 327.5, filed Oct. 29, 2012, and the entire content of both applications is incorporated herein by reference.

FIELD OF THE INVENTION

The invention relates to a formable film with a decorative surface.

BACKGROUND OF THE INVENTION

Decorative surfaces for moldings, in particular made of a plastics material provided with a film, are very well known. United States patent application publication 2009/0001752 describes by way of example a process for the production of a thermoplastic film with a three-dimensionally structured, embossed surface. DE 10 2006 019 867 A1 in turn discloses a process for the production of thermoformable plastics moldings by the negative deep-draw process.

The decorative surface mostly comprises a coating, preferably an outer layer and/or lacquer layer, where the lacquer layer can be composed of one or more (up to six) identical or different formulations). These formulations are in each case composed of one or more polymer resins, one or more matting agents, and optionally various crosslinking components and other additives, for example for adjusting abrasion resistance, frictional behavior, haptic properties, rheology, and resistance to light and to heat. It is also conventional in industry to add colorant components, such as dyes and/or pigments.

The entire lacquer layer can be composed of a plurality of layers of identical or different formulations, and it is not necessary here that every layer comprises the above components. The decorative surface frequently has a two-layer lacquer system made of undercoat lacquer and topcoat lacquer, or else has a three-layer lacquer system made of primer, undercoat lacquer, and topcoat lacquer. The primer here is responsible for promoting adhesion between the substrate which forms the decorative surface and the lacquer layers above them. The undercoat lacquer can have a plurality of functions: by way of example the provision of mattness, promoting adhesion between substrate and topcoat lacquer, etc. The topcoat lacquer generally has the function of adjusting the properties of the decorative surface to customer requirements.

Formulations of this type are disclosed by way of example in U.S. Pat. Nos. 8,314,179, 6,682,779, or else in DE 10 2009 049 630 A1. U.S. Pat. No. 8,314,179 describes water-based polymer mixtures for decorative surfaces for improvement of long-term functionality, while DE 10 2009 049 630 A1 discloses water-based and NMP-free polymer mixtures and application thereof to films for decorative surfaces. U.S. Pat. No. 6,682,779 describes water-based polyurethane lacquers for elastomers which comprise at least one compound having blocked isocyanate groups.

For the production of three-dimensional decorative surfaces from a flat plastics material, preferably a deep-draw film, the plastics material has to be subjected to stretching. Partial stretching factors up to 500% or more can arise, depending on the geometry of the component. A coating, preferably a lacquer system, is provided to deep-draw films of this type while they are still flat, and the films are then mostly embossed with a decorative grain. The lacquers used in this production variant are also termed deep-draw lacquers. Alternatively, lacquered deep-draw films are subjected to stretching and are embossed in the component.

The decorative grain on the decorative surface is composed of elevations, which are termed grain peaks, and depressions, which are termed grain valleys. During the embossing of the decorative grain the deep-draw lacquer is subjected to different degrees of stretching. In the region of the grain valleys the deep-draw lacquer is subjected to a greater degree of stretching than in the region of the grain peaks.

When this embossed film is then processed to give the component, for example by means of deep drawing, the entire decorative surface is also subjected to stretching. There are likewise different degrees of stretching here. The deep-draw lacquer is subjected to a greater degree of stretching in the region of the grain valleys than in the regions of the grain peaks. If the tensile strain at break of the deep-draw lacquer is exceeded, break-up of the decorative surface occurs. This break-up is discernible inter alia as graying and/or glossy spots in the grain valleys. Surface defects of this type are undesirable.

A summary of the disadvantages of the films disclosed hitherto in the decorative surface is as follows:

The decorative surface is intended to have uniform mattness depth. This mattness in the flat product cannot be retained on the entire final decorative surface during component production.

The decorative surface exhibits a stretching-dependent nonuniform increase of gloss level. The desired uniform mattness over the entire decorative surface is therefore not obtained.

In highly stretched regions the decorative surface exhibits areas of increased gloss, in particular in grain valleys, caused by microcracks or the like. Graying of the decorative surface also frequently occurs.

The emissions from decorative surfaces for moldings made of a plastics material provided with a film in the interior of an automobile do not meet the requirements of the market, firstly in quantitative terms, that is, excessive emissions, and secondly in qualitative terms, by way of example because of the presence of toluene.

The cleavage temperature required for the reaction with blocked isocyanate groups requires temperature-dryer-residence-time profiles which are not achievable, in either technical or operating-cost terms, for decorative-surface films. The blocking agent used for the blocked isocyanate groups also generates undesirable emissions and odors.

The decorative surfaces disclosed in the publications mentioned, which are merely examples, therefore no longer meet current market requirements.

SUMMARY OF THE INVENTION

It is therefore an object of the present invention to provide a formable film with a decorative surface, in particular for use in the interior of an automobile, where the decorative surface has uniform mattness depth. The mattness is intended to be freely adjustable.

The intention is that the decorative surface exhibits no increased gloss, and that there are no cracks or microcracks present. At the same time, the composite structure comprising a plurality of surfaces and having a decorative surface is intended to have a low level of emissions and to exhibit neutral color behavior, that is, no graying and no color drift.

The object is achieved in that the formable film has a decorative surface which has at least one coating which comprises the following constituents:
a) an aqueous dispersion of a hydroxy-functional prepolymer, obtainable via reaction of at least the following components:
   i) a component having hydroxy groups,
   ii) a polyester polyol having hydroxy groups,
   iii) a polyisocyanate having isocyanate groups,
   iv) a compound which has at least two groups reactive toward isocyanate groups, and which has at least one group capable of anion formation, and
   v) water,
where the components i) to iii) and the ratio of components i) to iii) are selected in such a way that an excess of hydroxy groups is present in relation to the isocyanate groups, and
b) nanoparticles with a number-average particle size from 1 to 1000 nm, and
c) a crosslinking agent which has at least two groups reactive toward hydroxy groups.

Surprisingly, it has been found that on the basis of the constituents described above it is possible to achieve a coating which provides mattness throughout the formable film, both in the grain valleys and on the grain peaks in particular after the deep-draw process, and at the same time has a low emissions level.

It is thus possible to comply with the abovementioned market requirements.

A group reactive toward isocyanate groups is a group that can react with an isocyanate group to form a covalent bond. Examples of groups reactive toward isocyanate groups are hydroxy and amine groups.

A group capable of anion formation is a group which can change from the molecular state to the anionic state. By way of example, dicarboxylic acids, hydroxymonocarboxylic acid, or dihydroxymonocarboxylic acid are suitable here.

Examples of suitable dicarboxylic acids are phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid, and 2,2-dimethylsuccinic acid. The corresponding anhydrides of these acids can likewise be suitable.

It is also possible to use monocarboxylic acids, for example benzoic acid and hexane carboxylic acid. A precondition here is that the functionality of the polyol is greater than 2. Preference is given to saturated aliphatic or aromatic acids. An example of these is adipic acid or isophthalic acid. It is optionally likewise possible to use small quantities of polycarboxylic acid, for example trimellitic acid.

Hydroxycarboxylic acids which serve as reactants in the production of the polyester polyols bear terminal hydroxy groups. Examples of these are hydroxycaproic acid, hydroxybutyric acid, hydroxydecanoic acid, hydroxystearic acid, and other corresponding acids. Examples of suitable lactones are caprolactones or butyrolactones.

DESCRIPTION OF THE PREFERRED EMBODIMENTS OF THE INVENTION

In a preferred embodiment, the number-average particle size of the nanoparticles can be from 1 to 1000 nm, preferably from 2 to 500 nm, and particularly preferably from 5 to 100 nm.

The average particle size was measured by laser correlation spectroscopy.

It is likewise preferable that the specific surface area of the nanoparticles is from 100 $m^2/g$ to 1000 $m^2/g$, preferably from 200 to 500 $m^2/g$, and particularly preferably from 250 to 400 $m^2/g$.

The specific surface area of the nanoparticles can be determined by the BET method (DIN ISO 9277:2003-05).

The nanoparticles can in particular comprise, or consist of, silicon dioxide, titanium dioxide, aluminum oxide, aluminum dioxide, manganese dioxide, manganese oxide, zinc oxide, zinc dioxide, cerium oxide, cerium dioxide, iron oxide, iron dioxide, and/or calcium carbonate. They can particularly preferably consist of silicon dioxide.

An embodiment of the invention provides that the coating composition also comprises at least one matting agent d).

Examples of suitable matting agents are Acematt 3300, Acematt® 3200 from Evonik, and also Acematt® TS 100, and Acematt® OK 412 from Evonik and also Polymatte® from Stahl or Astacin® Novomatt from BASF.

The component i) having hydroxy groups can by way of example be ethylene glycol, 1,2- and 1,3-propylene glycol, 1,3-, 1,4- and 2,3-butanediol, 1,6-hexanediol, 2,5-hexanediol, trimethylhexanediol, diethylene glycol, triethylene glycol, hydrogenated bisphenol, 1,4-cyclohexanediol, 1,4-cyclohexanedimethanol, neopentyl glycol, and/or trimethylpentanediol, trimethylolpropane, and/or glycerol.

In another preferred embodiment the component i) having hydroxy groups can comprise, or consist of, a polycarbonate polyol.

Suitable polycarbonates are obtainable by way of example via reaction of diphenyl carbonate, dimethyl carbonate, or phosgene with polyols, preferably diols. Examples of diols that can be used here are ethylene glycol, 1,2- and 1,3-propane diol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethyl-1,3-pentanediol, dipropylene glycol, polypropylene glycols, dibutylene glycol, polybutylene glycols, bisphenol A, tetrabromobisphenol A, and also lactone-modified diols. It is preferable that the diol comprises from 40 to 100% by weight of hexanediol, preferably 1,6-hexanediol, and/or hexanediol derivatives, particularly preferably those that have ether or ester groups alongside terminal OH groups, for example, products obtained via a reaction of 1 mol of hexanediol with at least 1 mol, preferably from 1 to 2 mol, of caprolactone, or via etherification of hexanediol with itself to give di- or trihexylene glycol.

It is also possible to use the polyether polycarbonatediols described in U.S. Pat. No. 4,808,691.

It is preferable that the polycarbonate polyols are of linear structure. However, they can optionally have a small extent of branching by virtue of incorporation of polyfunctional components, in particular of low-molecular-weight polyols. An example of a compound suitable for this purpose is glycerol, trimethylolpropane, 1,2,6-hexanetriol, 1,2,4-butanetriol, trimethylolethane, pentaerythritol, chinitol, mannitol, or sorbitol, methylglucoside, or 1,3:4,6-dianhydrohexitols.

It is also preferable that the weight-average molar mass of the polycarbonate polyol is from 500 to 3000 g/mol, preferably from 650 to 2500 g/mol, and particularly from 1000 to 2200 g/mol.

The weight-average molar mass of the polycarbonate polyol can be determined by means of GPC (gel permeation chromatography).

The polyester polyol ii) having hydroxy groups can in particular be compounds with number-average molecular weight $M_n$ from 400 to 6000 daltons, and preferably from 600 to 3000 daltons. The hydroxy number of these can be from 22 to 400 mg KOH/g, preferably from 50 to 300 mg KOH/g, and particularly preferably from 80 to 200 mg KOH/g. OH functionality can be in the range from 1.5 to 6, preferably from 1.8 to 3, and particularly preferably from 1.9 to 2.5.

Suitable polyester polyols ii) having hydroxy groups are the polycondensates known per se made of diols and optionally polyols (triols, tetraols) and of dicarboxylic acids and optionally polycarboxylic acids (tricarboxylic acids, tetracarboxylic acids) or hydroxycarboxylic acids or lactones. The production of the polyesters can also use, instead of the free polycarboxylic acids, the corresponding polycarboxylic anhydrides, or corresponding polycarboxylic esters of lower alcohols. Examples of suitable diols are ethylene glycol, butylene glycol, diethylene glycol, triethylene glycol, polyalkylene glycols, such as polyethylene glycol, and also propanediol and 1,4-butanediol, preference being given to 1,6-hexanediol, neopentyl glycol, and neopentyl glycol hydroxypivalate. Concomitant use may optionally also be made of polyols such as trimethylolpropane, glycerol, erythritol, pentaerythritol, trimethylolbenzene, or trishydroxyethyl isocyanurate.

Examples of suitable dicarboxylic acids are phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid, 2,2-dimethylsuccinic acid. The possible anhydrides of these acids are also suitable. For the purposes of the present invention the term "acid" always concomitantly comprises the anhydrides.

It is also possible to use monocarboxylic acids, for example benzoic acid and hexanecarboxylic acid, with the precondition that the average functionality of the polyol is greater than 2. Preference is given to saturated aliphatic or aromatic acids such as adipic acid or isophthalic acid. It is optionally likewise possible to make concomitant use of smaller quantities of polycarboxylic acid, for example trimellitic acid.

Examples of hydroxycarboxylic acids that can be used as reactants in the production of a polyester polyol having terminal hydroxy groups are hydroxycaproic acid, hydroxybutyric acid, hydroxydecanoic acid, hydroxystearic acid, and the like. Examples of suitable lactones are caprolactone and butyrolactone.

Examples of suitable polyisocyanates iii) are diisocyanates in the molecular weight range from 140 to 400 having aliphatically, cycloaliphatically, araliphatically, and/or aromatically bonded isocyanate groups, for example, 1,4-diisocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl) cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)isocyanatomethylcyclohexane, bis-(isocyanatomethyl)norbornane, 1,3- and 1,4-bis-(2-isocyanatoprop-2-yl)benzene (TMXDI), 2,4- and 2,6-diisocyanatotoluene (TDI), 2,4'- and 4,4'-diisocyanatodiphenylmethane, 1,5-diisocyanatonaphthalene or any desired mixtures of these diisocyanates. Preference is given here to polyisocyanates or polyisocyanate mixtures of the type mentioned with exclusively aliphatically and/or cycloaliphatically bonded isocyanate groups. Particular preference is given to polyisocyanates or polyisocyanate mixtures based on HDI, IPDI and/or 4,4'-diisocyanatodicyclohexylmethane.

Other suitable polyisocyanates alongside these simple diisocyanates are those that comprise heteroatoms in the moiety that provides linking to the isocyanate groups, and/or those that have a functionality of more than two isocyanate groups per molecule. The former are by way of example polyisocyanates which have uretdione, isocyanurate, urethane, allophanate, biuret, carbodiimide, iminooxadiazinedione and/or oxadiazinetrione structure, composed of at least two diisocyanates and produced via modification of simple aliphatic, cycloaliphatic, araliphatic, and/or aromatic diisocyanates; an example that may be mentioned of an unmodified polyisocyanate having more than two isocyanate groups per molecule is 4-isocyanatomethyloctane 1,8-diisocyanate (nonane triisocyanate).

The polyisocyanate iii) can in particular comprise an aliphatic isocyanate, preferably an aliphatic diisocyanate, and particularly preferably at least one compound selected from the group of hexamethylene diisocyanate, isophorone diisocyanate, and 1-isocyanato-4-[(4-isocyanatocyclohexyl)methyl]cyclohexane.

The compound iv) can be ionic or potentially ionic compounds. Examples are mono- and dihydroxycarboxylic, mono- and diaminocarboxylic acids, mono- and dihydroxysulfonic acids, mono- and diaminosulfonic acids, and salts thereof, for example dihydroxycarboxylic acids, hydroxypivalic acid, N-(2-aminoethyl)-β-alanine, 2-(2-aminoethylamino)ethanesulfonic acid, ethylenediaminepropyl- or butylsulfonic acid, 1,2- or 1,3-propylenediamine-β-ethylsulfonic acid, lysine, 3,5-diaminobenzoic acid, the hydrophilizing agent of example 1 in EP-A 0 916 647, and the alkali metal and/or ammonium salts of these; the adduct formed by sodium bisulfite with butene-2-diol-1,4-polyethersulfonate, or the propoxylated adduct formed from 2-butenediol with $NaHSO_3$ (for example, in DE-A 2 446 440, pp. 5-9, formula I-III). Preferred ionic or potential ionic compounds are those having carboxy and/or carboxylate groups. Particularly preferred ionic compounds are dihydroxycarboxylic acids, in particular α,α-dimethylolalkanoic acids, such as 2,2-dimethylolacetic acid, 2,2-dimethylolpropionic acid, 2,2-dimethylolbutyric acid, 2,2-dimethylolpentanoic acid, or dihydroxysuccinic acid.

Compounds that can also be reacted concomitantly in the production of the hydroxy-functional prepolymer a) are low-molecular-weight chain extenders with molecular weight in the range from 60 to 400 daltons, and preferably from 62 to 200 daltons, having at least two isocyanate-reactive groups. The chain extenders can by way of example be polyols or polyamines.

Polyols suitable as chain extenders used can be compounds having up to 20 carbon atoms per molecule, for example, ethylene glycol, diethylene glycol, triethylene glycol, 1,2-propanediol, 1,3-propanediol, 1,4-butanediol, butylene 1,3-glycol, cyclohexanediol, 1,4-cyclohexanedimethanol, 1,6-hexanediol, hydroquinone dihydroxyethyl ether, bisphenol A [2,2-bis(4-hydroxyphenyl)propane], hydrogenated bisphenol A (2,2-bis(4-hydroxycyclohexyl)propane) and mixtures of these, and also trimethylolpropane, glycerol, or pentaerythritol. It is also possible to use esterdiols, for example δ-hydroxybutyl ε-hydroxycaproate, ω-hydroxyhexyl γ-hydroxybutyrate, β-hydroxyethyl adipate, or bis(β-hydroxyethyl) terephthalate.

Examples of suitable polyamines for chain extension are ethylenediamine, 1,2- and 1,3-diaminopropane, 1,4-diaminobutane, 1,6-diaminohexane, isophoronediamine, the isomer mixture of 2,2,4- and 2,4,4-trimethylhexamethylenediamine, 2-methylpentamethylenediamine, diethylenetriamine, 1,3- and 1,4-xylylenediamine, α,α,α', α'-tetramethyl-1,3- and -1,4-xylylenediamine and 4,4-diaminodicyclohexylmethane, dimethylethylenediamine, hydrazine, and adipic dihydrazide.

A chain terminator can also be reacted concomitantly during the production of the hydroxy-functional prepolymer a). These units derive by way of example from monofunctional compounds reactive toward isocyanate groups, for example monoamines, in particular mono-secondary amines, or monoalcohols. Particular mention may be made here of methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl) aminopropylamine, morpholine, piperidine, and substituted derivatives of these, amide amines made of di-primary amines and monocarboxylic acids, monoketimines of di-primary amines, primary/tertiary amines, for example, N,N-dimethylaminopropylamine.

The polyurethane resin can also use protective units localized at the chain ends. These units derive on the one hand from monofunctional, isocyanate-reactive components, in particular mono-secondary amines, or monoalcohols. Some illustrative examples of these substances are as follows: methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl) aminopropylamine, morpholine, piperidine, and substituted derivatives of the compounds mentioned, amidoamines of di-primary amines and mono, monocarboxylic acids, monoketimines of the di-primary amines, primary/secondary/tertiary amines—for example N,N-dimethylaminopropylamine, methyldimethylamine.

Compounds likewise suitable are substances which comprise active hydrogen atoms which can distinguish between the isocyanate groups in terms of reactivity. These are by way of example molecules which also comprise a secondary amino group alongside a primary amino group, or else a COOH group alongside an OH group, or else OH groups alongside an amino group (primary or secondary). Preference is given to components which also comprise OH groups alongside an amino group (primary or secondary). Examples of these primary/secondary amines are: 3-amino-1-methylaminopropane, 3-amino-1-ethylaminopropane, 3-amino-1-cyclohexylaminopropane, 3-amino-1-methylaminobutane; monohydroxycarboxylic acids, for example hydroxyacetic acid, lactic acid, or maleic acid, and also alkanolamines such as N-aminoethylethanolamine, ethanolamine, 3-aminopropanol, neopentanolamine, and, with appropriate preference, diethanolamine, methyldiethanolamine. In this way it is possible to introduce additional functional groups into the polymer.

Compounds likewise suitable as chain terminators are those comprising active hydrogen atoms with different reactivity toward isocyanate groups. These are by way of example compounds which also comprise secondary amino groups alongside a primary amino group, or else COOH groups alongside an OH group, or else OH groups alongside an amino group (primary or secondary). Preference is given to compounds which also comprise OH groups alongside an amino group (primary or secondary). Examples here are primary/secondary amines, such as 3-amino-1-methylaminopropane, 3-amino-1-ethylaminopropane, 3-amino-1-cyclohexylaminopropane, 3-amino-1-methylaminobutane; monohydroxycarboxylic acids, for example hydroxyacetic acid, lactic acid, or malic acid, and also alkanolamines such as N-aminoethylethanolamine, ethanolamine, 3-aminopropanol, neopentanolamine, and, particularly preferably diethanolamine. In this way it is possible to achieve additional introduction of functional groups into the polymeric final product.

It is likewise possible that the production of the hydroxy-functional prepolymer a) also involves concomitant reaction of compounds having non-ionic hydrophilizing action, for example, polyoxyalkylene ethers having at least one hydroxy or amino group. These polyethers comprise a proportion of from 30%, by weight to 100% by weight of units derived from ethylene oxide. Compounds that can be used are linear polyethers with functionality from 1 to 3, and also compounds of the general formula (I),

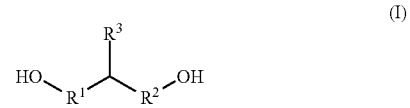

in which
$R^1$ and $R^2$ are mutually independently respectively a divalent aliphatic, cycloaliphatic, or aromatic moiety having from 1 to 18 C atoms which can have interruption by oxygen and/or nitrogen atoms, and
$R^3$ is a non-hydroxy-terminated polyester or preferably polyether, in particular an alkoxy-terminated polyethylene oxide moiety.

The urethanization reaction in the prepolymer production process can be carried out at temperatures of from 0° C. to 140° C., depending on the reactivity of the polyisocyanate used. The urethanization reaction can be accelerated by using suitable catalysts of the type known to the person skilled in the art for accelerating the NCO—OH reaction. Examples are tertiary amines, for example, triethylamine, organotin compounds, for example, dibutyltin oxide, dibutyltin dilaurate, and tin bis(2-ethylhexanoate), and other organometallic compounds.

Compounds suitable as crosslinking agents are melamine-formaldehyde or urea-formaldehyde condensates of the type described by way of example in D. H. Solomon, The Chemistry of Organic Filmformers, pp. 235 ff., John Wiley & Sons, Inc., New York, 1967. However, it is also possible to replace all or some of the melamine resins with other amine resins of the type described by way of example in Methoden der organischen Chemie [Methods of organic chemistry] (Houben-Weyl), Vol. 14/2, Part 2, 4$^{th}$ Edition, Georg Thieme Verlag, Stuttgart 1963, pp. 319 ff.

Other suitable crosslinking resins are blocked polyisocyanates based by way of example on isophorone diisocyanate, hexamethylene diisocyanate, 1,4-diisocyanatecyclohexane, bis(4-isocyanatocyclohexyl)methane, 1,3-diisocyanatobenzene, 1,4-diisocyanatobenzene, 2,4-diisocyanate-1-methylbenzene, 1,3-diisocyanate-2-methylbenzene, 1,3-bis-isocyanatomethylbenzene, 2,4-bis-isocyanatomethyl-1,5-dimethylbenzene, bis(4-isocyanatophenyl)propane, tris(4-isocyanatophenyl)methane and/or trimethyl-1,6-diisocyanatohexane.

Compounds that are moreover likewise suitable are blocked isocyanate adducts, for example biuret polyisocyanates based on 1,6-diisocyanatohexane; isocyanurate polyisocyanates based on 1,6-diisocyanatohexane; and urethane-modified polyisocyanate adducts produced from 2,4- and/or 2,6-diisocyanatotoluene or isophorone diisocyanate and low-molecular-weight polyhydroxy components (for example trimethylolpropane, the isomeric propanediol or butanediol, or a mixture of these polyhydroxy components), where the isocyanate group of the polyisocyanate adduct has been blocked.

Suitable blocking agents for these polyisocyanates are monofunctional alcohols such as methanol, ethanol, butanol, hexanol, and benzyl alcohol; oximes such as acetoximes and methyl ethyl ketoxime; lactams such as epsilon-caprolactam, phenol; and CH-acidic components such as diethyl malonate.

Crosslinking agents that are likewise suitable are polyisocyanate crosslinking agents, amide- and amine-formaldehyde resins, phenolic resins, aldehyde resins, and ketone resins, for example phenol-formaldehyde resin, resols, furan resins, urea resins, carbamic ester resins, triazine resins, melamine resins, benzoguanamine resins, cyanamide resins, and aniline resins, as described in "Lackharze" [Coating resins], D. Stoye, W. Freitag, Carl Hanser Verlag, Munich, 1996.

In one preferred embodiment the crosslinking agent c) can have at least two isocyanate groups as groups reactive toward hydroxy.

Examples of suitable isocyanate-functionalized crosslinking agents are low-viscosity, hydrophobic or hydrophilized polyisocyanates having free isocyanate groups, based on aliphatic, cycloaliphatic, araliphatic, and/or aromatic isocyanates, particularly preferably based on aliphatic or cycloaliphatic isocyanates, since this permits achievement of a particularly high level of robustness in the lacquer film. The advantage of the binder dispersion in this invention is in particular obtained in combination with these crosslinking agents. It is also possible, if necessary, to use the polyisocyanates in the form of mixture of the polyisocyanate with small quantities of inert solvents or inert solvent mixtures—in order to reduce viscosity level. Triisocyanatononanes can likewise be used alone or in a mixture with other compounds as crosslinking component.

The viscosity of the crosslinking agent c) is also advantageously from 10 to 10000 mPas at 23° C.

The viscosity of the crosslinking agent can be determined here in accordance with DIN 53019 with a shear gradient of 40 s$^{-1}$.

The coating can comprise other additional substances. These are selected here from the group consisting of light stabilizers, for example UV absorbers and reversible free-radical scavengers, and/or antioxidants, and/or substrate wetting agents, and/or other wetting agents, and/or emulsifiers, and/or leveling agents, and/or film-forming auxiliaries, and/or rheology auxiliaries, and/or flame retardants, and/or biocides, and/or neutralizing agents, and/or antifoams, and/or thickeners, and/or inorganic fillers, and/or organic fillers, and/or pigments.

The coating particularly advantageously comprises at least one film-forming polymer dispersion. It is preferable that this film-forming polymer dispersion is based on at least one polyurethane and/or at least one polyurethane acrylate, and/or at least one polyacrylate.

It is also possible to use other additional substances known to the person skilled in the art. These additional substances are described inter alia in:
the textbook "Lackadditive" [Lacquer additives] by Johann Bielemann, Wiley-VCH, Weinheim, N.Y. 1998,
Lehrbuch der Lacke and Beschichtungen, Band 4 (Lösemittel, Weichmacher, Additive) [Textbook of lacquers and coatings, Volume 4 (solvents, plasticizers, additives)], edited by Martina Oertelt, 2$^{nd}$ Edition, S. Hirzel Verlag, Stuttgart 2007.

As base material of the formable film of the invention it is preferable to use a plastics material composed of a polymer mixture based on polyvinyl chloride (PVC), in particular on flexible PVC, on polyurethane (PUR), on polyolefin, on polyester (PES), on acrylonitrile-butadiene-styrene copolymer (ABS), on polymethyl methacrylate, on polycarbonate, on polyacrylate, or on copolymers. Suitable polyurethanes are described by way of example in U.S. Pat. No. 6,852,418, while suitable polyolefins are described by way of example in United States patent application publication 2002/0187309, or else in EP1688460B1. It is likewise possible that the base material also comprises at least one polar or nonpolar rubber, for example natural rubber, butadiene rubber, ethylene-propylene rubbers, et cetera.

The base material can have one or more layers. At least one layer here can take the form of a foamed layer: by way of example a first layer of the base material can be based on at least one thermoplastic olefin, and a second layer can be based on a polyolefin foam.

Other possible base materials, however, are covering materials, known as synthetic leather, based on PVC, PUR, or TPO.

The base material is frequently also termed substrate.

The formable film preferably has one or more layers. For the purposes of the present invention, formable means that the film can be/is subjected to a forming process during the shaping process. The forming process to which the film is subjected here can take place at low temperature (cold forming) or at high temperature (deep drawing). It is possible here to use any of the types of forming processes known to the person skilled in the art. A particularly suitable example is the standard deep-draw process in which a film previously produced and provided, by roll-based processes, with a surface embossment or surface grain is subjected to a forming process to give a three-dimensional structure having the geometry of a component, by bringing the film into contact with a deep-drawing ram that has the profile of the subsequent component. This standard deep-draw process can be carried out at low temperature or at high temperature. Another process for the production of individual moldings from a mold is the "in-mold-graining process (IMG process)", which has been developed as a specialized process derived from the negative deep-draw process, and is generally carried out at high temperature. In the case of the in-mold-graining (IMG) process a grain is provided to a single- or multilayer lacquered film in the mold during the thermoplastic forming process. The IMG process and other shaping processes that can be used are described by way of example in United States patent application publications 2008/0193684 or in EP 2263856B1.

However, it is also possible that the film can be subjected to a forming process by means of various lamination processes. These lamination processes are generally carried out at low temperature. Processes that can be used here are not only the particularly preferred press-lamination process using two hard mold halves but also the membrane lamination process, combination processes derived from press lamination processes, wrapping processes, and cutting/punching processes, and also the leather lamination process.

It is preferable that the formable film has been subjected to a deep-draw process. Particularly useful advantages are obtained in respect of mattness throughout the grain valleys and the grain peaks in the case of deep-drawable films.

It is preferable to use the formable film as material for the interior of an automobile, especially in the form of a dashboard or of an interior cladding component, in particular of a seat-covering material, for a vehicle.

The decorative surface can also have one or more layers. The coating of the decorative surface can also have one or more layers: the coating of the invention can therefore be used as primer, as undercoat lacquer, or else as topcoat lacquer. The coating layers can have the same composition here, but they can also have a different composition.

The formable film will now be explained in more detail with reference to embodiments C1, C2, I1, and I2, and to corresponding experimental results shown in Table 1. All data for the embodiments are stated in % by weight.

Embodiments C1 and C2

Undercoat lacquer:

| | |
|---|---|
| Solvent-based polyurethane dispersion | 32.8 |
| Diluent (toluene/IPA 50/50) | 64.2 |
| Matting agent (inorganic) | 1.4 |
| Polyisocyanate (HDI biuret) | 1.6 |

Topcoat lacquer:

| | |
|---|---|
| Aqueous high-molecular-weight polyurethane dispersion | 21.60 |
| Organic matting agent comprising polymer | 47.20 |
| Diluent (2-propanol/water 50/50) | 21.86 |
| Dimethylaminoethanol | 0.19 |
| Antifoam | 0.43 |
| Substrate-wetting agent | 0.43 |
| Slip additive | 4.30 |
| Thickener/demineralized water (1:1) | 1.51 |
| Demineralized water | 1.00 |
| Polyisocyanate (HDI trimer) | 1.48 |

Embodiments I1 and I2

Primer:

| | |
|---|---|
| Aqueous high-molecular-weight polyurethane dispersion | 49.12 |
| Diluent (2-propanol/water 50/50) | 30.00 |
| Dimethylaminoethanol | 0.26 |
| Antifoam | 0.39 |
| Thickener/demineralized water (1:1) | 2.30 |
| Demineralized water (1:1) | 15.64 |
| Polyisocyanate (HDI trimer) | 1.90 |

Undercoat lacquer:

| | |
|---|---|
| Aqueous high-molecular-weight polyurethane dispersion | 12.48 |
| Aqueous low-molecular-weight polyurethane dispersion of the invention | 28.18 |
| Diluent (2-propanol/water 50/50) | 35.47 |
| Matting masterbatch (inorganic) | 15.67 |
| Dimethylaminoethanol | 0.72 |
| Antifoam | 0.39 |
| Substrate-wetting agent | 0.39 |
| Thickener/demineralized water (1:1) | 5.91 |
| Polyisocyanate (HDI trimer) | 0.79 |

Topcoat lacquer:

| | |
|---|---|
| Aqueous high-molecular-weight polyurethane dispersion | 21.60 |
| Organic matting agent comprising polymer | 47.20 |
| Diluent (2-propanol/water 50/50) | 21.86 |
| Dimethylaminoethanol | 0.19 |
| Antifoam | 0.43 |
| Substrate-wetting agent | 0.43 |
| Slip additive | 4.30 |
| Thickener/demineralized water (1:1) | 1.51 |
| Demineralized water | 1.00 |
| Polyisocyanate (HDI trimer) | 1.48 |

TABLE 1

| Property | C1 | I1 | C2 | I2 |
|---|---|---|---|---|
| Colourfastness and aging in accordance with DIN EN ISO 105-B06 (10 cycles) | 4.5 | 4.5 | 4.5 | 4.5 |
| Solar simulation test in accordance with DIN 75220 D-IN1-T Trim: $\Delta E^*/\Delta L^*$ | 0.3/−0.3 | 0.4/0.4 | 1.2/−1.2 | 0.9/−0.9 |
| Fingernail test: (15N) | ok | ok | ok | ok |
| Manual abrasion test (BMW-Abrex) | — | ok | — | ok |
| Glossy grain valleys after thermoforming | not ok | ok | not ok | ok |

Films C1 and C2 comprise no aqueous low-molecular-weight polyurethane dispersion of the invention. C1 and I1 comprise a polyolefin base material and have been radiation-crosslinked, whereas C2 and I2 are uncrosslinked but likewise comprise polyolefin as base material.

The films of the invention moreover have only low content of volatile organic compounds (VOC test in accordance with VDA 278): with 13 µg/g of toluene equivalent (toluene-free) in contrast with reference films C1 and C2: 189 µg/g of toluene equivalent (171 µg/g of this toluene equivalent being toluene).

It is understood that the foregoing description is that of the preferred embodiments of the invention and that various changes and modifications may be made thereto without departing from the spirit and scope of the invention as defined in the appended claims.

What is claimed is:

1. A formable film with a decorative surface, the decorative surface having a coating comprising:
   a) an aqueous dispersion of a hydroxy-functional prepolymer, obtained via reaction of at least the following components:
      i) a component having hydroxy groups,
      ii) a polyester polyol having hydroxy groups,
      iii) a polyisocyanate having isocyanate groups,
      iv) a compound which has at least two groups reactive toward isocyanate groups, and which has at least one group capable of anion formation, and
      v) water, where the components i) to iii) and the ratio of components i) to iii) are selected in such a way that the hydroxy-functional prepolymer has an excess of hydroxy groups;
b) nanoparticles with number-average particle size from 5 to 100 nm;
c) a crosslinking agent that has at least two groups reactive toward hydroxy groups; and,
d) at least one matting agent,
wherein the nanoparticles are inorganic oxides or carbonates,
wherein the nanoparticles have a specific surface area of from 100 m$^2$/g to 1000 m$^2$/g, and
wherein the decorative surface coating has a uniform mattness throughout the grain valleys and grain peaks.

2. The formable film with decorative surface as claimed in claim 1, wherein the film is subjected to a forming process.

3. The formable film with decorative surface as claimed in claim 1, wherein the film is a single-or multilayer film.

4. The formable film with decorative surface as claimed in claim 1 being provided in the interior of an automobile.

5. The formable film with decorative surface as claimed in claim 1, wherein the component having a hydroxy group is a polycarbonate polyol.

6. The formable film with decorative surface as claimed in claim 5, wherein the polycarbonate polyol is 1000 g/mol to 2200 g/mol weight average molecular weight and/or 600 Daltons to 3000 Daltons number-averaged molecular weight.

7. The formable film with decorative surface as claimed in claim 1, wherein the content of volatile organic compounds (VOC) in the formable film is 13 μg/g of toluene equivalent or less.

8. A formable film with a decorative surface, the decorative surface having a coating comprising:
a) an aqueous dispersion of a hydroxy-functional prepolymer, obtained via reaction of at least the following components:
i) a component having hydroxy groups,
ii) a polyester polyol having hydroxy groups,
iii) a polyisocyanate having isocyanate groups,
iv) a compound which has at least two groups reactive toward isocyanate groups, and which has at least one group capable of anion formation, and
v) water,
where the components i) to iii) and the ratio of components i) to iii) are selected in such a way that the hydroxy-functional prepolymer has an excess of hydroxy groups;
b) nanoparticles with number-average particle size from 5 to 100 nm;
c) a crosslinking agent which has at least two groups reactive toward hydroxy groups; and,
d) at least one matting agent,
wherein the nanoparticles are inorganic oxides or carbonates,
wherein the nanoparticles have a specific surface area of from 100 m$^2$/g to 1000 m$^2$/g, and
wherein the hydroxy-functional prepolymer is concomitantly reacted with a polyoxyalkylene ether having at least one hydroxy or amino group.

9. The formable film of claim 1, wherein the uniform mattness is maintained after thermoforming the formable film.

10. A thermoformed film comprising a decorative surface coating, wherein the decorative surface coating comprises:
a) an aqueous dispersion of a hydroxy-functional prepolymer, obtained via reaction of at least the following components:
i) a component having hydroxy groups,
ii) a polyester polyol having hydroxy groups,
iii) a polyisocyanate having isocyanate groups,
iv) a compound which has at least two groups reactive toward isocyanate groups, and which has at least one group capable of anion formation, and
v) water,
where the components i) to iii) and the ratio of components i) to iii) are selected in such a way that the hydroxy-functional prepolymer has an excess of hydroxy groups;
b) nanoparticles with number-average particle size from 5 to 100 nm;
c) a crosslinking agent which has at least two groups reactive toward hydroxy groups; and,
d) at least one matting agent,
wherein the decorative surface coating is embossed with a decorative grain comprising one or more grain valleys and/or grain peaks, and
wherein the decorative surface coating has a uniform mattness throughout the grain valleys and/or grain peaks.

11. An automobile interior surface comprising a thermoformed film, wherein the thermoformed film comprises a decorative surface comprising a coating, wherein the decorative surface coating comprises:
a) an aqueous dispersion of a hydroxy-functional prepolymer, obtained via reaction of at least the following components:
i) a component having hydroxy groups,
ii) a polyester polyol having hydroxy groups,
iii) a polyisocyanate having isocyanate groups,
iv) a compound which has at least two groups reactive toward isocyanate groups, and which has at least one group capable of anion formation, and
v) water,
where the components i) to iii) and the ratio of components i) to iii) are selected in such a way that the hydroxy-functional prepolymer has an excess of hydroxy groups;
b) nanoparticles with number-average particle size from 5 to 100 nm;
c) a crosslinking agent which has at least two groups reactive toward hydroxy groups; and,
d) at least one matting agent,
wherein the decorative surface coating is embossed with a decorative grain comprising one or more grain valleys and/or grain peaks, and
wherein the decorative surface coating has a uniform mattness throughout the grain valleys and/or grain peaks.

12. The automobile interior surface of claim 11, wherein the interior surface is a dashboard or a seat-covering.

* * * * *

UNITED STATES PATENT AND TRADEMARK OFFICE
CERTIFICATE OF CORRECTION

PATENT NO. : 10,066,122 B2
APPLICATION NO. : 14/698422
DATED : September 4, 2018
INVENTOR(S) : Iben et al.

Page 1 of 1

It is certified that error appears in the above-identified patent and that said Letters Patent is hereby corrected as shown below:

In the Specification

Column 10:
Line 1: delete "Lehrbuch der Lacke and Beschichtungen" and substitute -- Lehrbuch der Lacke und Beschichtungen -- therefor.

Column 13:
Line 19: delete "single-or multilayer" and substitute -- single- or multilayer -- therefor.

Signed and Sealed this
Ninth Day of April, 2019

Andrei Iancu
*Director of the United States Patent and Trademark Office*